(12) United States Patent
Schlensker

(10) Patent No.: US 9,494,280 B2
(45) Date of Patent: Nov. 15, 2016

(54) CONDENSATE DRAIN FOR PRESSURIZED GAS SYSTEM

(75) Inventor: Herbert Schlensker, Leverkusen (DE)

(73) Assignee: BEKO TECHNOLOGIES GMBH, Neuss (DE)

( * ) Notice: Subject to any disclaimer, the term of this patent is extended or adjusted under 35 U.S.C. 154(b) by 165 days.

(21) Appl. No.: 14/117,217

(22) PCT Filed: May 11, 2012

(86) PCT No.: PCT/EP2012/058776
§ 371 (c)(1),
(2), (4) Date: Nov. 12, 2013

(87) PCT Pub. No.: WO2012/152921
PCT Pub. Date: Nov. 15, 2012

(65) Prior Publication Data
US 2014/0150891 A1 Jun. 5, 2014

(30) Foreign Application Priority Data
May 11, 2011 (DE) .......... 10 2011 101 227

(51) Int. Cl.
F16T 1/38 (2006.01)
F16T 1/00 (2006.01)
F16T 1/34 (2006.01)

(52) U.S. Cl.
CPC .. *F16T 1/38* (2013.01); *F16T 1/00* (2013.01); *F16T 1/34* (2013.01); *Y10T 137/3084* (2015.04)

(58) Field of Classification Search
CPC ........... F16T 1/38; F15B 21/08; G05D 15/00
USPC .............. 137/381, 187, 115.01, 197
See application file for complete search history.

(56) References Cited

U.S. PATENT DOCUMENTS

| | | | |
|---|---|---|---|
| 3,905,385 A * | 9/1975 | Green .......................... | 137/187 |
| 4,780,638 A * | 10/1988 | Reinelt et al. ................ | 310/339 |
| 5,992,436 A * | 11/1999 | Hellman et al. .................. | 137/1 |
| 7,699,238 B2 * | 4/2010 | Sinstedten ...................... | 236/52 |
| 2002/0124666 A1 | 9/2002 | Navarro et al. | |
| 2003/0116191 A1* | 6/2003 | Dobies et al. ................. | 137/204 |

(Continued)

FOREIGN PATENT DOCUMENTS

DE 102005048646 * 10/2005 .............. F15B 21/08

OTHER PUBLICATIONS

Festo AG & Co., Control Device for Fluid Actuator, Oct. 11, 2005, Machine Translation.*

(Continued)

*Primary Examiner* — Craig Schneider
*Assistant Examiner* — Daniel P Donegan
(74) *Attorney, Agent, or Firm* — Cantor Colburn LLP

(57) ABSTRACT

A condensate drain for pressurized gas systems, having a condensate collecting chamber, which can be connected to the pressurized gas system via a condensate inflow and has a condensate outflow that can be closed by means of an electrically operable valve, at least one electronic fitting level gauge, with which the condensate filling level in the condensate collecting chamber can be detected, and an electronic control unit, with which the condensate filling level detected by means of the filling level gauge can be evaluated and the valve can be operated, where the condensate drain has at least one battery, which provides the power supply for at least the control unit, the fitting level gauge and the valve.

3 Claims, 4 Drawing Sheets

(56) References Cited

U.S. PATENT DOCUMENTS

2003/0178411 A1* 9/2003 Manganiello et al. ....... 219/496
2007/0001019 A1* 1/2007 Sinstedten .................. 236/93 R
2014/0150891 A1* 6/2014 Schlensker ................... 137/197

OTHER PUBLICATIONS

Japanese Unexamined Patent Application Publication No. Hei 3-20192, "STEAM TRAP", Jan. 29, 1991, pp. 1, Abstract.

* cited by examiner

CONDENSATE DRAIN FOR PRESSURIZED GAS SYSTEM

TECHNICAL FIELD

The present invention relates to a condensate drain for pressurized gas systems, in particular pressurized air systems.

BACKGROUND

Condensate drains of this type are used for example in pressurized air technology in order to remove from the pressure line network the condensate normally produced therein, which, besides water, may also contain oil or rust. The condensates are produced from the moisture of the ambient air, which is sucked in by a pressurized air compressor in order to generate the pressurized air. The oil originates substantially from the compressors, in which it is used as lubricant, whereas the rust generally originates from the pressurized air lines.

Different designs of condensate drains are known. These generally function in such a way that a valve is opened, whereby the condensate is driven out from the pressurized air network by the pressure. With this approach, the gas loss or pressurized air loss is to be minimized for reasons of economic viability during operation of the pressurized gas system.

Known condensate drains can be divided basically into three groups in accordance with the type of valve control and the energy supply:

What are known as float drains function with a hollow body, which is raised by the buoyancy force of the liquid (condensate) collecting in a collecting chamber and thereby operates a valve. This valve opens, generally indirectly by means of a servo control, an outlet opening of the collecting chamber, through which the condensate is pushed out. The condensate drains formed as float drains are very widespread due to the fact that they can be produced cost effectively, but are also susceptible to failure.

Furthermore, condensate drains having time-controlled solenoid valves, which are electrically operated valves, are known. These condensate drains open the valves in adjustable time intervals. It is disadvantageous if the valves are opened in the absence of condensate whereby energy losses are caused as a result of the outlet of pressurized air.

Lastly, condensate drains having electronically level-controlled valves, also referred to hereinafter as electronically level-controlled condensate drains or as electronic condensate drains for short, detect a collecting liquid or condensate volume by an electronic filling level sensor. When a specific volume is reached, the valve is opened and precisely this volume is drained without additional pressurized air losses. These types of condensate drains are relatively expensive in terms of production, but are characterized by very cost-effective operation, as a result of which significant cost advantages can be achieved with the electronically level-controlled condensate drains over the entire operating service life thereof. The electronically level-controlled condensate drains have become established in the meantime as a favorable solution for draining condensate from pressurized gas systems.

An electronically level-controlled condensate drain 20 for a pressurized gas system 21, in particular a pressurized air system, according to the prior art is illustrated in FIG. 4 of the drawing accompanying this description. The condensate drain 20 has a condensate collecting chamber 22, which can be connected via a condensate inflow 23 to the pressurized gas system 21. A condensate, which then collects in the condensate collecting chamber 22 of the condensate drain 20, in particular at the base of the condensate collecting chamber 22, is thus removed from the pressurized gas system 21, for example at a lowest point of a pipeline. The condensate collecting chamber 22 further has a condensate outflow 25 that can be closed by means of an electrically operable valve 24. The condensate filling level in the condensate collecting chamber 22 is detected by means of at least one electronic filling level gauge 26, for example a capacitive filling level sensor, which protrudes in the case of the condensate drain 20 illustrated FIG. 4 into the condensate collecting chamber 22. An electronic control unit 27 evaluates the condensate filling level in the condensate collecting chamber 22, said filling level being detected by means of the filling level sensor 26, and, as soon as a specific condensate volume in the condensate collecting chamber 22 is reached, the control unit 27 opens the valve 24 in order to drain this condensate volume from the condensate collecting chamber 22. Once the condensate has been drained from the condensate collecting chamber 22, the control unit 27 closes the valve 24 again in order to avoid unnecessary pressurized air loss from the pressurized gas system 21. In the case of the condensate drain 20 illustrated in FIG. 4, the valve 24 is opened and closed by an electrically operable magnet or electromagnet 28. It is therefore an electrically operable solenoid valve.

For the operation of electronically level-controlled condensate drains, electrical energy is necessary due to the operating principle of these drains. In FIG. 4, this is illustrated by means of an electric energy supply line 29 leading to the condensate drain 20. This may be a disadvantage however depending on the installation site, for example if there are very large distances between the point at which the pressurized air is generated, which generally has an electrical energy supply, and the point at which the pressurized air is used. In such a case, a complex routing of electrical lines to the condensate drain is necessary. Also in the case of operation of the electric condensate drain in an atmosphere at risk of explosion, the electrical supply of the condensate drain and the equipment thereof, due to the possible formation of electric ignition sparks, are rather complex due to the explosion protection measures to be taken into consideration.

In the case of electronic condensate drains according to the prior art, such as the condensate drain 20 illustrated in FIG. 4, a function monitoring is also conventional. Here, an alarm signal for example is triggered via an electrical transmission line 30 leading away from the condensate drain 20 when the level of condensate collected in the condensate collecting chamber 22 remains constant in spite of the condensate discharge procedure. In particular, an alarm signal or fault signal is transmitted by means of the line 30 from the condensate drain 20 to an attendant, usually in a potential-free manner. Fault signals at the condensate drain may further also be indicated via optical or acoustic signaling devices, for example warning lights or warning sirens. In this case too, a complex wiring is necessary depending on the installation site, for example with a large distance between the condensate drain and the attendant, and the acoustic or optical warning signals are less effective.

BRIEF SUMMARY

On this basis, the invention seeks to create a condensate drain for pressurized gas systems, in particular pressurized air systems, which overcomes the disadvantages described beforehand of previously known condensate drains. In particular, the installation effort for the condensate drain at installation sites which have no electrical energy supply is to be low. Furthermore, it should also be possible to provide the condensate drain in a manner suitable for use in atmosphere at risk of explosion or at least cost effectively, that is to say without great structural effort.

The invention provides a condensate drain for pressurized gas systems, in particular pressurized air systems.

In accordance with the invention, a condensate drain for pressurized gas systems, in particular pressurized air systems, has a condensate collecting chamber which can be connected to the pressurized gas system via a condensate inflow and has a condensate outflow that can be closed by means of an electrically operable valve. Furthermore, the condensate drain according to the invention has at least one electronic filling level gauge, for example a capacitive filling level sensor, with which the condensate filling level in the condensate collecting chamber can be detected, and an electronic control unit, with which the condensate filling level detected by means of the filling level gauge can be evaluated and the valve can be operated. In accordance with the invention, a battery is also provided, which provides the power supply for at least the control unit, the filling level gauge and the valve. In this case, the battery can be both integrated in the condensate drain and may form a structural unit together therewith, or can be formed as an independent unit, separate from the condensate drain, which is connectable to the condensate drain in this case via appropriate electrical lines. The battery expediently has a capacitance that is sufficient to ensure the operation of the condensate drain at least over a specific period of time.

In other words, the battery therefore provides the electrical supply of all electrical components of the condensate drain according to the invention. The condensate drain is therefore operable self-sufficiently independently of an electrical energy supply provided at the installation site. As a result, the installation effort for the condensate drain according to the invention is reduced considerably, since it is possible to dispense completely with a complex electrical line routing to the site of installation of the condensate drain. In addition, the battery operation of the condensate drain simplifies the explosion protection measures to be taken into consideration when designing the condensate drain for a use in an atmosphere at risk of explosion.

The electrically operable valve is preferably a valve operable by means of an electromagnet, for example an electrically operable solenoid valve. In particular, it is an electronically level-controlled valve or solenoid valve as described in the introduction of the description.

In accordance with an advantageous embodiment of the invention, the battery is a rechargeable battery. Furthermore, at least one power generator is provided, with which electrical energy can be generated by a flow of fluid and which is fluidically connected to the valve downstream thereof and provides the generated electrical energy to the battery in order to charge the battery. In this embodiment, the flow of fluid is to be understood in particular to be the condensate drained by the valve from the condensate collecting chamber and pressurized by the pressurized gas. It is also possible however, once the condensate has been discharged from the condensate collecting chamber, for pressurized gas, in particular pressurized air, to additionally be discharged from the condensate drain via the valve, said pressurized gas driving the power generator for the generation of energy. In this regard, a flow of fluid is to be understood within the meaning of the present invention to mean both the flow of liquid formed by the condensate during a draining process and also the pressurized gas flow formed by the pressurized gas. The electrically self-sufficient operation of the condensate drain according to the invention is considerably improved by the rechargeable battery and the power generator for converting into electrical energy the pneumatic energy of the pressurized gas system, available in any case at the site of installation of the condensate drain. In addition, no additional components apart from the power generator are required in order to form the condensate drain according to the invention, since the provided components of the condensate drain are used optimally.

For example, the battery can be charged automatically during any normal process of draining the condensate from the condensate collecting chamber. Alternatively or additionally hereto, the electronic control unit may also be designed to monitor the charged state of the battery and, after identifying a critical charged state, to initiate one or more condensate draining processes in order to increase the charged state of the battery to a desired level. Should there be no condensate located in the condensate collecting chamber, the pressurized gas flowing out from the condensate drain is used for the energy conversion by the power generator.

In accordance with a further advantageous embodiment of the invention, the battery is a rechargeable battery. In addition, a pressurized gas outlet for discharging pressurized gas from the pressurized gas system is provided on the condensate drain and can be closed by a second electrically operable valve. This second valve, which likewise is supplied with electrical energy by the battery, is preferably also a solenoid valve operable by means of an electromagnet. Furthermore, at least one power generator is provided, with which electrical energy can be generated from a flow of fluid, and which is fluidically connected to the second electrically operable valve, downstream thereof. This power generator provides the generated electrical energy to the battery in order to charge the battery. In this embodiment, the flow of fluid is to be understood in particular to mean the pressurized gas, for example pressurized air, that can be removed from the pressurized gas system via the pressurized outlet. This embodiment also considerably improves the electrically self-sufficient operation of the condensate drain according to the invention by use of the pneumatic energy of the pressurized gas system available in any case at the site of installation of the condensate drain, and by the conversion of said energy with the aid of the power generator into electrical energy to charge the battery.

The electronic control unit of the condensate drain is advantageously designed to monitor the charged state of the battery and in addition also to operate the second valve. As soon as a critical charged state is identified, the control unit opens the second valve in order to feed pressurized gas from the pressurized gas system to the power generator and to thus increase the charged state of the battery to a desired level. As soon as the desired charged state of the battery is reached, the control device closes the valve again.

In accordance with a further advantageous embodiment of the invention, the pressurized gas outlet is arranged on the condensate collecting chamber above a maximum condensate filling level. The pressurized gas outlet is particularly preferably arranged in a constantly condensate-free protection zone in the upper region of the condensate collecting chamber. Pressurized gas or pressurized air that is substantially free from condensate, that is to say clean, is thus available in order to operate the power generator.

In accordance with further advantageous embodiments of the inventions, the power generator is a power generator functioning in accordance with the piezoelectric principle and having a piezo crystal that is activatable by pressure swing loads caused by the flow of fluid, that is to say by the condensate and/or pressurized gas, or is a power generator functioning in accordance with the dynamo principle and having a turbine wheel that can be driven by the flow of fluid, that is to say by the flow of condensate or the flow of pressurized gas.

In accordance with a further advantageous embodiment of the invention, a radio module is provided, with which alarm signals and/or the operating state of the condensate drain can be transmitted to an attendant and/or a telephone of a maintenance worker. In this case, the radio module may also be connected to the condensate drain in a structural unit or can be connected to the condensate drain as a separate unit via appropriate electrical lines. In any case, the supply of electrical energy is provided by the battery of the condensate drain. The radio module ensures a reliable transmission of alarm signals and/or the operating state of the condensate drain, without having to route electrical transmission lines in a complex manner for this purpose.

BRIEF DESCRIPTION OF THE DRAWINGS

Further advantageous details and effects of the invention are explained in greater detail hereinafter on the basis of two exemplary embodiments illustrated in the figures, in which.

DETAILED DESCRIPTION

In the different figures, like parts are always provided with the same reference signs, and these parts are therefore generally also only described once.

Figure 1:
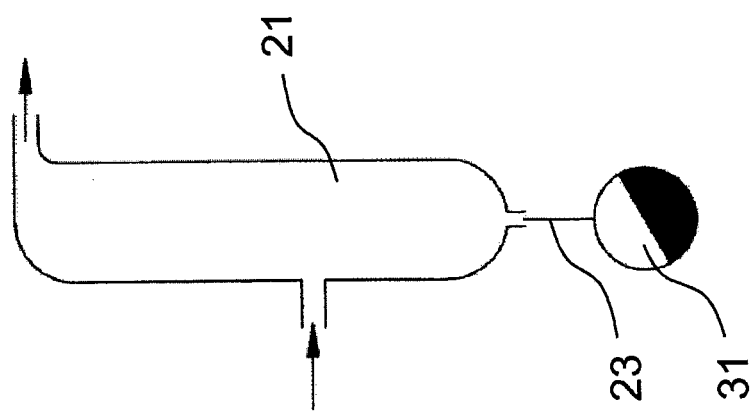
FIG. 1 shows a schematic illustration of a pressurized gas system with a connected condensate drain according to the invention.

FIG. 1 shows a schematic illustration of a pressurized gas system 21, in particular a pressurized air system, having a condensate drain 31 according to the invention, in particular an electronically level-controlled condensate drain. As can be inferred from FIG. 1, the condensate drain 31 is preferably connected via a condensate inflow 23 to the pressurized gas system at a low point of a pipeline, for example.

Figure 2:
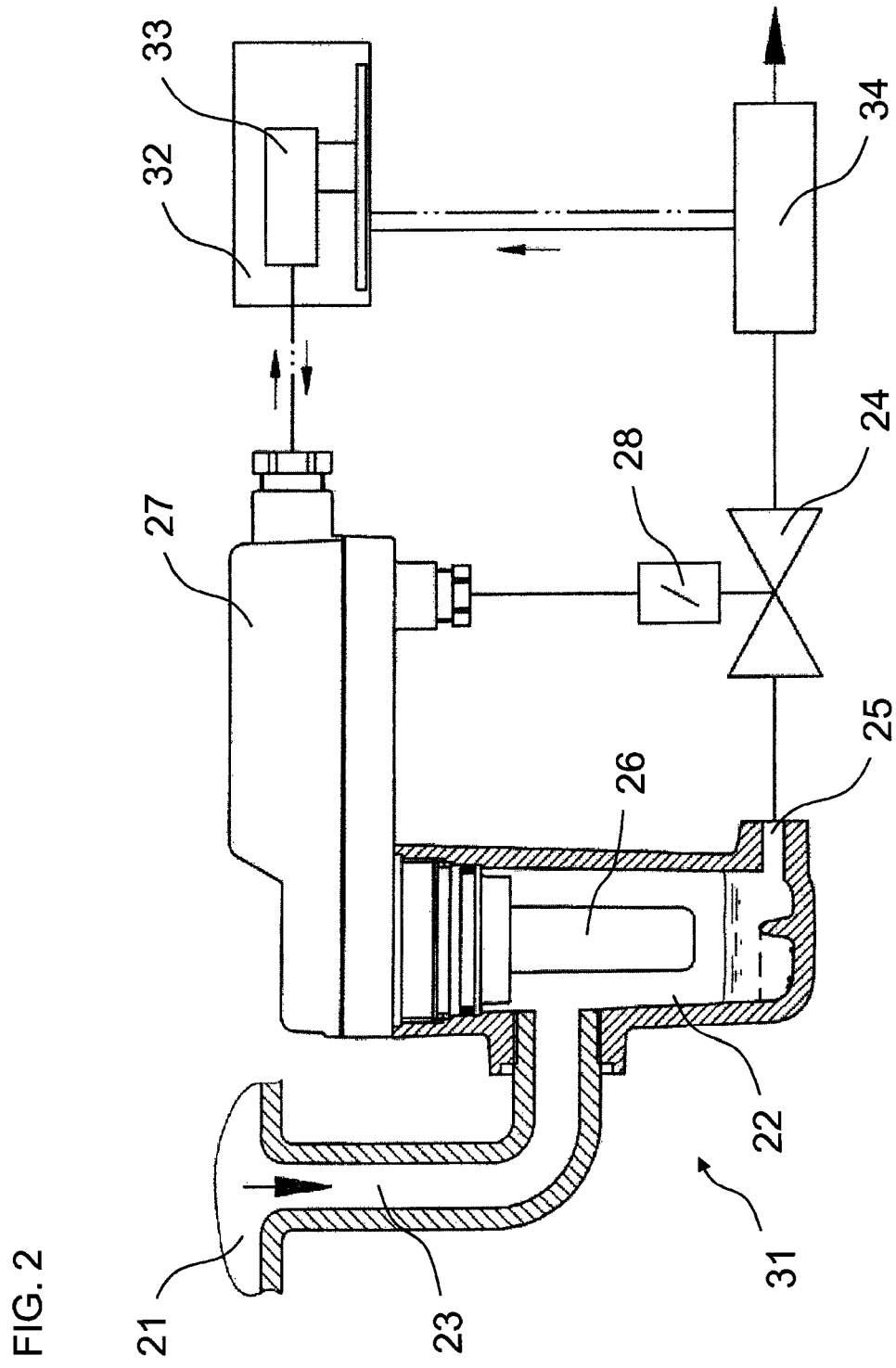
FIG. 2 shows a partial sectional view from the side of a first exemplary embodiment of a condensate drain according to the invention.

The condensate drain 31 according to the invention is illustrated in FIG. 2 in a first embodiment in a detailed partial sectional view from the side. A repeated description of all functionally like components of the condensate drain 31 according to the invention described already in conjunction with the condensate drain 20 according to the prior art is omitted here. This basically concerns the elements denoted by reference signs 21 to 27.

The condensate drain 31 according to the invention illustrated in FIG. 2 additionally has at least one battery 33 received in a battery unit 32 structurally separate from the condensate drain 31. The battery unit 32 or the battery 33 is connected via an electrical connecting line to the electronic control unit 27 of the condensate drain 31. The battery unit 32 or the battery 33 provides the supply of all electrical components of the condensate drain 31, that is to say basically the filling level gauge 26, the electronic control unit 27, and the valve 24 or the electromagnet 28 for controlling the valve 24.

It can also be seen in FIG. 2 that a power generator 34 is fluidically connected to the outlet side of the valve 24, downstream of the valve 24. The power generator 34 is preferably a power generator functioning in accordance with the piezoelectric principle and having a piezo crystal that is activatable by pressure swing loads caused by the flow of fluid, that is to say by the condensate and/or pressurized gas, or is a power generator functioning in accordance with the dynamo principle and having a turbine wheel that can be driven by the flow of fluid, that is to say by the flow of condensate or flow of pressurized gas. The energy generated by the power generator 34 is provided to the battery unit 32 or the battery 33 via an appropriate electrical connecting line between the power generator 34 and the battery unit 32 in order to charge the battery 33.

In the exemplary embodiment of the condensate drain 31 according to the invention illustrated in FIG. 2, the battery 33 can thus be charged automatically during each process of draining the condensate from the condensate collecting chamber 22. Alternatively or additionally, it is advantageous if, for example, the electronic control unit 27 monitors the charged state of the battery unit 32 or of the battery 33 and, after identifying a critical charged state, carries out one or more condensate draining processes via the valve 24 in order to increase the charged state of the battery unit 32 or of the battery 33 to a desired level. Since the power generator 34 is designed to convert a flow of fluid into electrical energy, it is possible, if there is no longer any condensate in the condensate collecting chamber 22, for pressurized gas or pressurized air flowing out from the condensate drain 25 to be used for energy conversion by the power generator 34.

Figure 3:
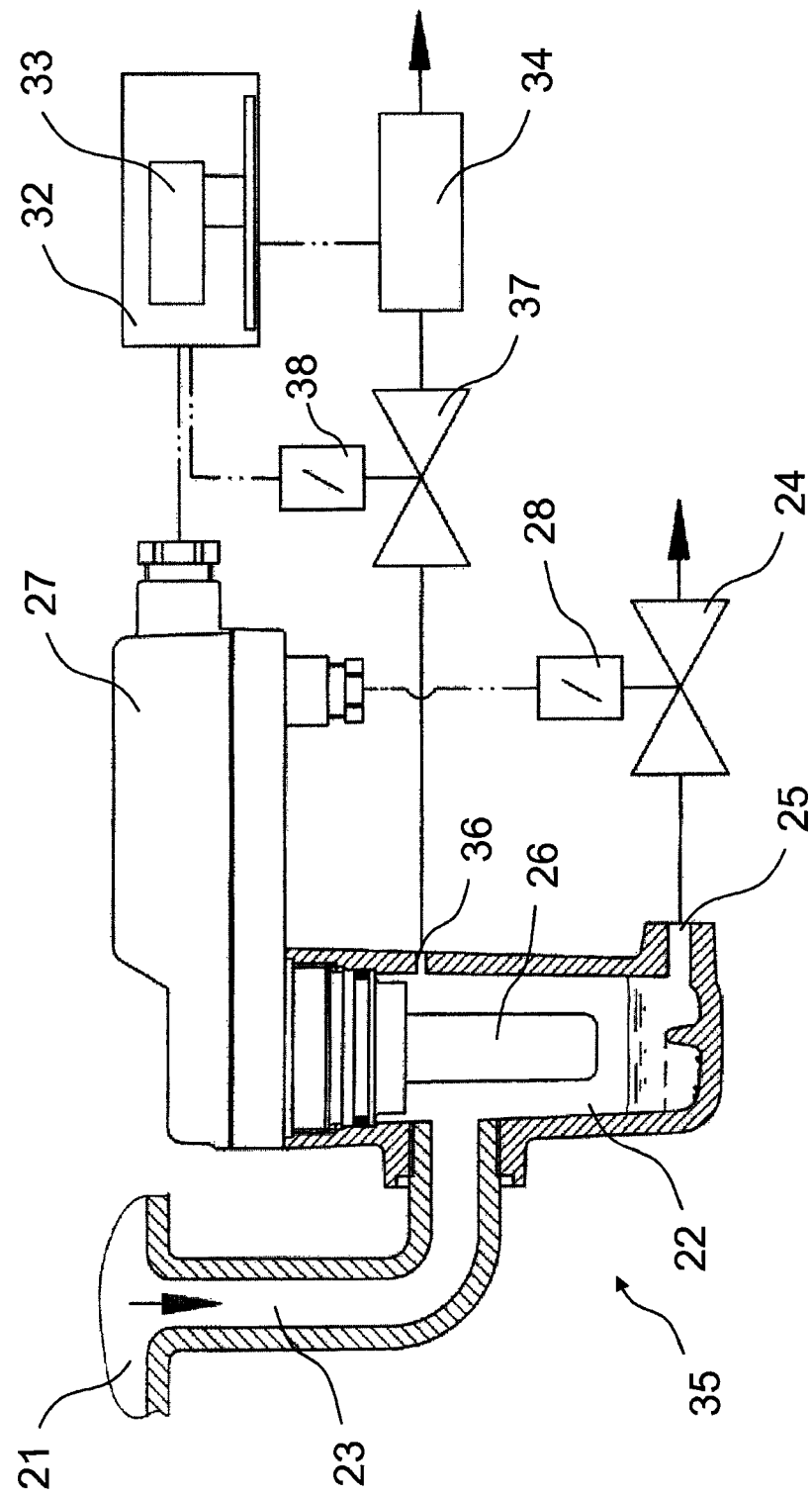
FIG. 3 shows a partial sectional view from the side of a second exemplary embodiment of a condensate drain according to the invention.
Figure 4:
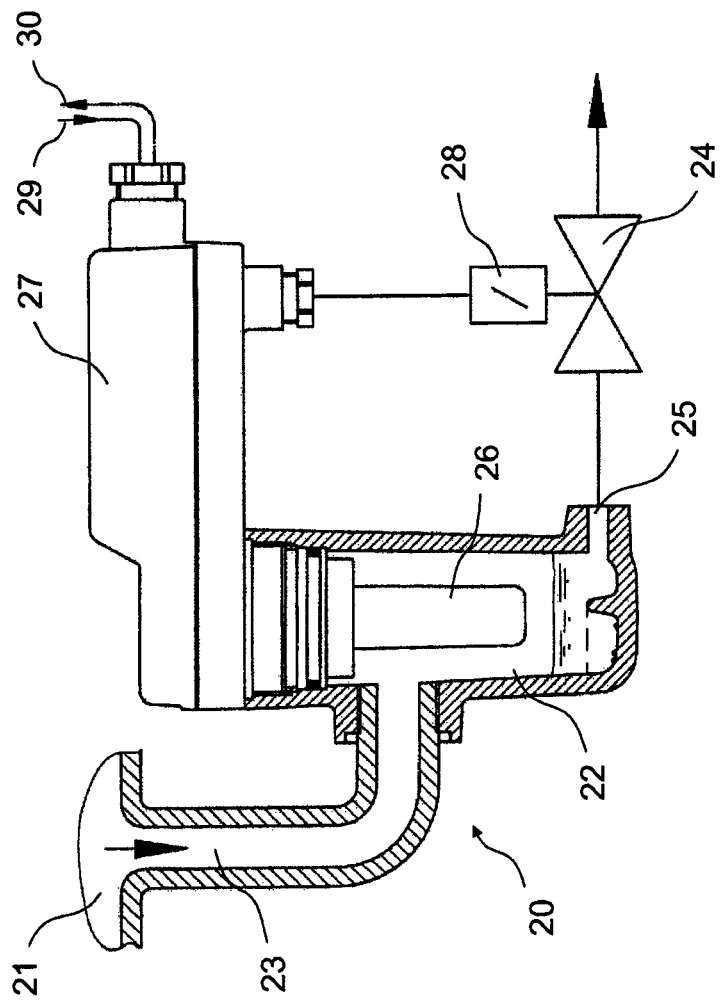
FIG. 4 shows a partial sectional view from the side of a condensate drain according to the prior art.

FIG. 3 illustrates a partial sectional view from the side of a second exemplary embodiment of a condensate drain 35 according to the invention, in particular of an electronically level-controlled condensate drain. The condensate drain 35 basically differs from the condensate drain 31 illustrated in FIG. 2 in that the power generator 34 can be supplied with pressurized gas from the condensate collecting chamber 22 via a pressurized gas outlet 36 provided on the condensate collecting chamber 22. To this end, the condensate drain 35 comprises a second, likewise electrically operable, valve 37, with which the pressurized gas outlet 36 can be closed. In the embodiment illustrated in FIG. 3, this second valve 37 is also a solenoid valve operable by means of an electromagnet 38. The valve 37 or the electromagnet 38 is supplied accordingly with electrical energy by the battery unit 32 or the battery 33.

In the embodiment of the condensate drain 35 according to the invention illustrated in FIG. 3, an electronic control unit not shown in greater detail in FIG. 3 is also provided in the battery unit 32. This monitors the charged state of the battery 33 and controls the valve 37 via the electromagnet 38, which for this purpose is connected by means of an electrical connecting line to the battery unit 32, as illustrated in FIG. 3. This control task could also be taken over however by an appropriate design of the electronic unit 27. The variant shown in FIG. 3 has the advantage however that a substantially conventional condensate drain can also be retrofitted subsequently without great effort with the battery unit 32 or battery 33, the power generator 34 and the valve 37 operable electrically by means of the electromagnet 38. Unless already provided, the pressurized gas outlet 36, which is to be fluidically connected to an input connection of the valve 37, is to be provided on the condensate collecting chamber 22, merely by way of example. As soon as the control unit of the battery unit 32 identifies a critical charged state of the battery 33, it opens the valve 37 in order to feed pressurized gas or pressurized air from the pressurized gas system to the power generator 34 and to thus increase the charged state of the battery 33 to a desired level. As soon as the desired charged state of the battery 33 is reached, the control device closes the valve 37 again.

Both condensate drains 31 and 35 illustrated in FIGS. 2 and 3 can each also be equipped with a radio module for the purpose of a function transmission, by means of which alarm signals and/or the operating state of the respective condensate drain 31 or 35 can be transmitted to an attendant and/or a telephone of a maintenance worker. The radio module can in this case be connected in a structural unit to the condensate drain 31 or 35 or the battery unit 32, or may be connected as a separate unit via appropriate electrical lines to the condensate drain 31 or 35, similarly to the battery unit 32. In any case, the electrical energy supply of the radio module is provided by the battery unit 32 or the battery 33.

The condensate drain according to the invention has been explained in greater detail on the basis of two exemplary embodiments illustrated in the figures. The condensate drain is not limited however to the embodiments described herein, but also includes further embodiments operating similarly.

In a preferred embodiment, the battery-operated condensate drain according to the invention is used to drain condensate from pressurized gas systems, in particular pressurized air systems.

The invention claimed is:

1. A condensate drain for pressurized gas systems, comprising:
   a condensate collecting chamber, which can be connected to the pressurized gas system via a condensate inflow and has a condensate outflow that can be closed by means of a first electrically operable valve,
   at least one electronic filling level gauge, with which the condensate filling level in the condensate collecting chamber can be detected,
   an electronic control unit, with which the condensate filling level detected by means of the filling level gauge can be evaluated and the first electrically operable valve can be operated, and
   at least one battery, which provides the power supply for at least the control unit, the filling level gauge and the first electrically operable valve,
   wherein the battery is a rechargeable battery, and
   a pressurized gas outlet is provided on the condensate drain to let out pressurized gas from the pressurized gas system, and at least one power generator is provided, with which electrical energy can be generated from a flow of pressurized gas and which is fluidically connected to a second electrically operable valve, the at least one power generator being downstream of said second electrically operable valve, with which the pressurized gas outlet can be closed, and which provides the generated electrical energy to the battery in order to charge the battery.

2. The condensate drain according to claim 1, wherein the pressurized gas outlet is arranged on the condensate collecting chamber above a maximum condensate filling level.

3. The condensate drain according to claim 1, wherein the power generator is a power generator functioning in accordance with the piezoelectric principle and having a piezo crystal that is activatable by pressure swing loads caused by the flow of condensate or pressurized gas, or is a power generator functioning in accordance with the dynamo principle and having a turbine wheel that can be driven by the flow of condensate or pressurized gas.

* * * * *